Fig. 1.

Inventor
Edwin T. Gorham
By Moulton & Lurrauce
Attorneys

E. T. GORHAM.
GRINDING MACHINE.
APPLICATION FILED MAR. 13, 1917.

1,268,961.

Patented June 11, 1918
11 SHEETS—SHEET 2.

Fig. 2.

Inventor
Edwin T. Gorham
By Moulton & Lirrance
Attorneys.

Fig. 3

E. T. GORHAM.
GRINDING MACHINE.
APPLICATION FILED MAR. 13, 1917.

1,268,961.

Patented June 11, 1918.
1 SHEETS—SHEET 6.

Inventor
Edwin T. Gorham
By Moulton & Liveaua
Attorneys.

E. T. GORHAM.
GRINDING MACHINE.
APPLICATION FILED MAR. 13, 1917.

1,268,961.

Patented June 11, 1918.
11 SHEETS—SHEET 7.

Inventor
Edwin T. Gorham
By Moulton & Luriana
Attorneys.

E. T. GORHAM.
GRINDING MACHINE.
APPLICATION FILED MAR. 13, 1917.

1,268,961.

Patented June 11, 1918.
11 SHEETS—SHEET 8.

Inventor
Edwin T Gorham
By Moulton & Lirrance
Attorneys.

UNITED STATES PATENT OFFICE.

EDWIN T. GORHAM, OF GRAND RAPIDS, MICHIGAN, ASSIGNOR TO WILMARTH & MORMAN COMPANY, OF GRAND RAPIDS, MICHIGAN, A CORPORATION OF MICHIGAN.

GRINDING-MACHINE.

1,268,961.     Specification of Letters Patent.      Patented June 11, 1918.

Application filed March 13, 1917. Serial No. 154,459.

*To all whom it may concern:*

Be it known that I, EDWIN T. GORHAM, a citizen of the United States of America, residing at Grand Rapids, in the county of Kent and State of Michigan, have invented certain new and useful Improvements in Grinding-Machines; and I do hereby declare the following to be a full, clear, and exact description of the invention, such as will enable others skilled in the art to which it appertains to make and use the same.

This invention relates to grinding machines; and it has for its object and purpose the provision of many novel features of construction and arrangement of parts, hereinafter fully described and particularly specified in the claims, for the attainment in a single machine, of the grinding of practically any and all types of work such as has been heretofore ordinarily accomplished on separate grinding machines of different types. The machine in fact is a grinder of universal application and the wide range of use of the machine is possible through many novel constructions which will appear more fully as understanding of the invention, from the following description, is obtained, reference being had to the accompanying drawings illustrating the same in which:

Like reference characters refer to like parts throughout the several views of the drawings.

Figures 22A, 23A:
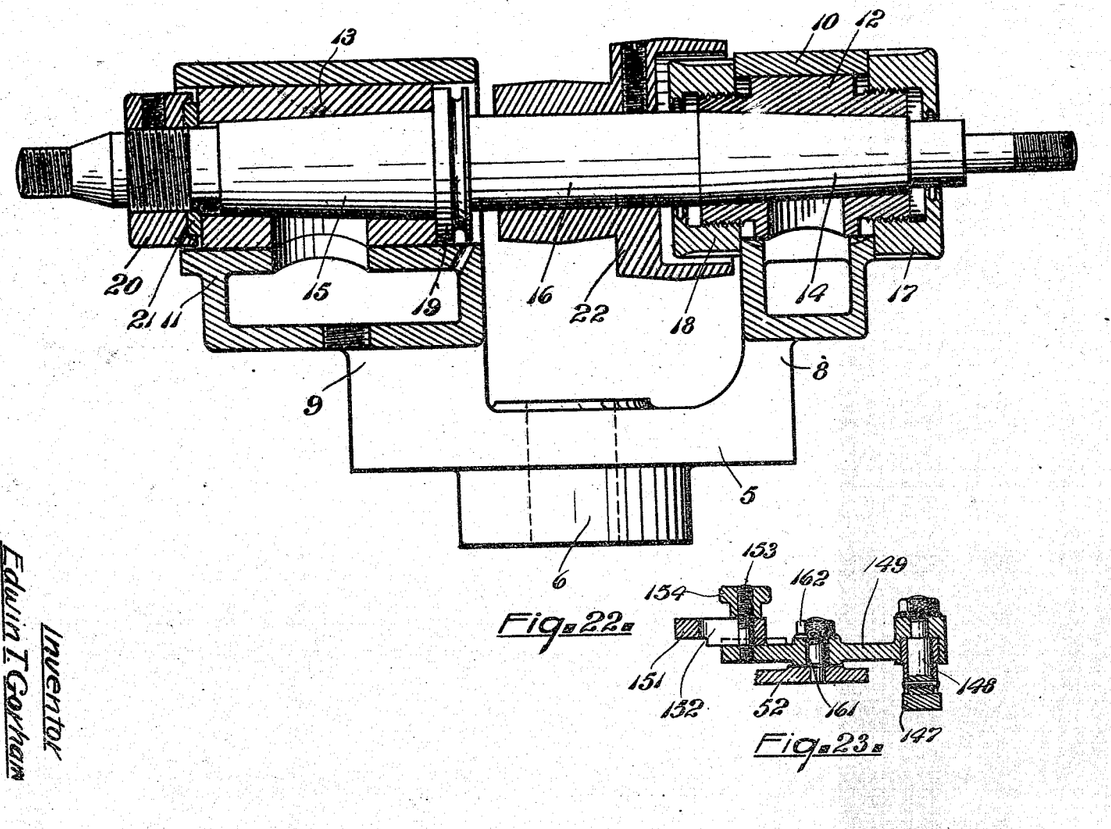
Fig. 22 is a vertical longitudinal section illustrating the mounting of the shaft upon which the grinding wheels are secured.
Fig. 23 is a vertical section on line 23—23 of Fig. 7.

In the construction of the machine a supporting base 1, preferably of cast iron, is provided immediately above which a plate or ring 2 is positioned, on which a cylindrical standard or post 3 is placed, screws 4 passing through the base 1, plate 2 and into the lower end of the post to secure them in fixed relation to each other. At the upper end of the post 3 a head 5 is placed having a depending projection 6 which inserts in a suitable recess in the upper end of the post to properly locate the same with respect to the standard. Said head is secured firmly to the standard by a set screw 7 threading into a horizontal web 7ª cast integral with and adjacent the upper end of the post. Spaced upright arms 8 and 9 are cast integral with the head 5, at the upper ends of which suitable journals 10 and 11 are formed adapted to receive bushings 12 and 13 which serve as bearings for the shaft on which the grinding wheels are secured. The shaft adjacent its ends has tapered sections 14 and 15 fitting within the bushings 12 and 13 and a central cylindrical section 16. The ends of the bushing 12 are reduced in diameter and exteriorly threaded, the outer end receiving a threaded cap 17 which bears against the outer end of the journal 10, while the other end receives a similar cap 18 which bears against the inner end of the journal 10. A collar 19 is formed on the shaft between sections 15 and 16 against which one end of bushing 13 bears, and a nut 20 threads on to the shaft against a washer 21 which in turn bears against the other end of the bushing 13 as shown in Fig. 22, it being possible by this construction to adjust the bushings on the shaft to take up wear if at any time it should become necessary. A drive pulley 22 is fixed upon the section 16 of the shaft between the journals 10 and 11 and grinding wheels 23 and 24 may be secured in any suitable manner at the ends of the shaft. The shaft is adapted to be driven through a belt around the pulley 22 leading to any suitable motor, line shaft or other source of power.

Figure 1:
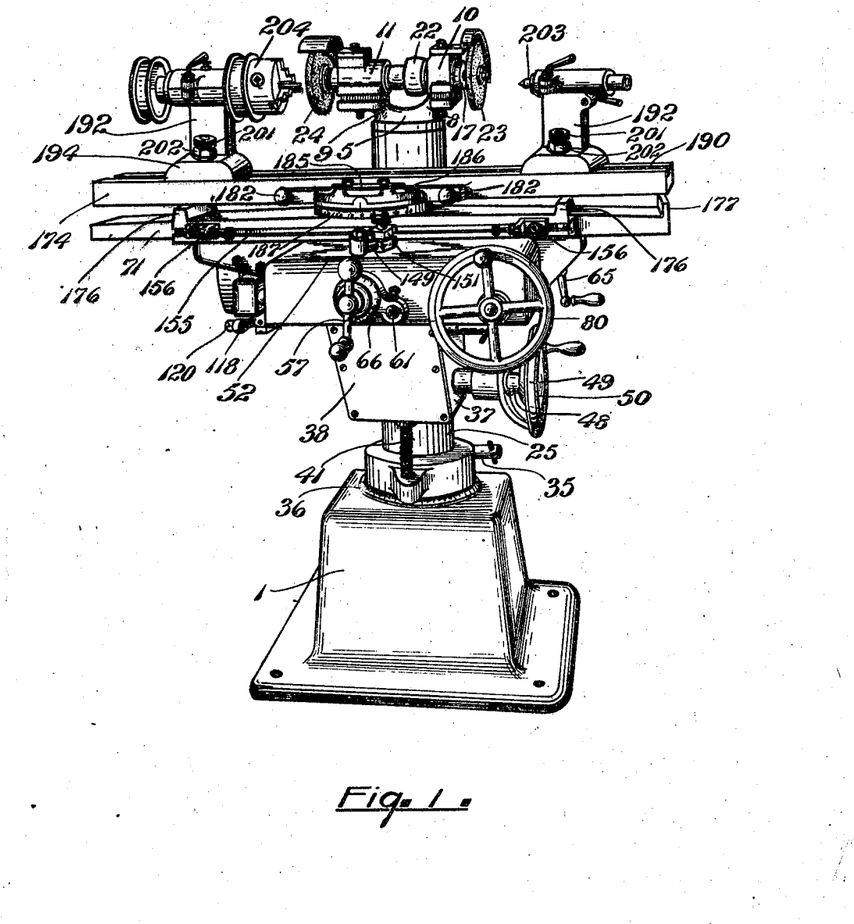
Figure 1 is a perspective view, from the front and a little to one side, of the grinding machine.
Figure 3:
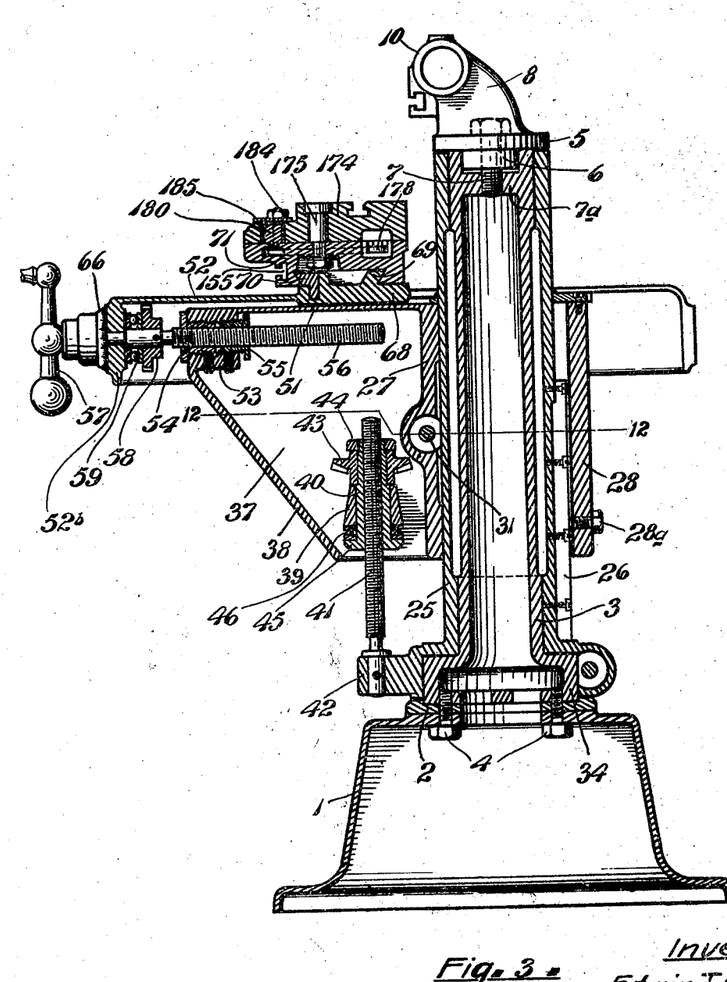
Fig. 3 is a vertical transverse section illustrating particularly the mounting of the machine upon its support.
Figure 12:
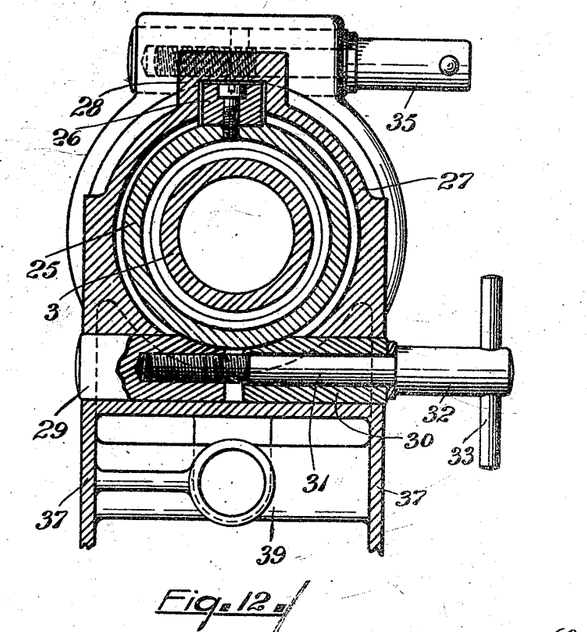
Fig. 12 is a horizontal section taken substantially on the line 12—12 of Fig. 3.
Figures 13, 14:
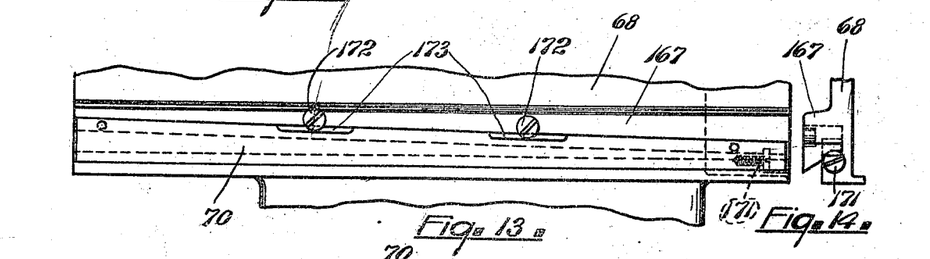
Fig. 13 is a fragmentary plan view of the main table showing the adjustment of the gib for the sliding table.
Fig. 14 is an end view of Fig. 13.
Figures 15, 16:
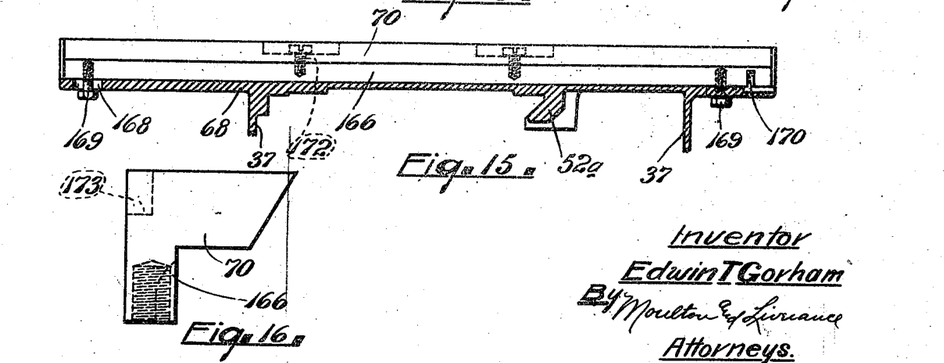
Fig. 15 is a fragmentary section and front elevation indicating the attachment of said gib to the main table.
Fig. 16 is an enlarged end view of the gib from the opposite end of that shown in Fig. 14.
Figure 17:
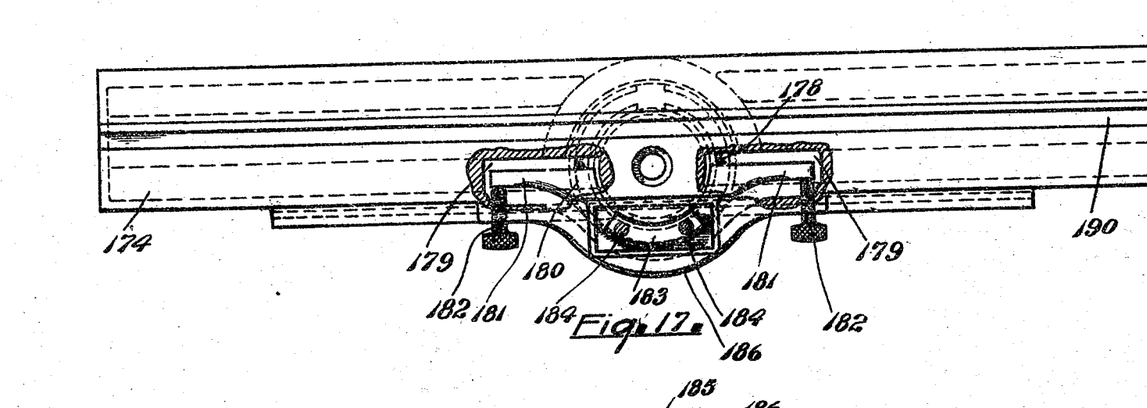
Fig. 17 is a plan view, with parts broken away and shown in section, illustrating the adjusting mechanism for the angular adjustment of the work or swinging table.
Figures 18, 19:
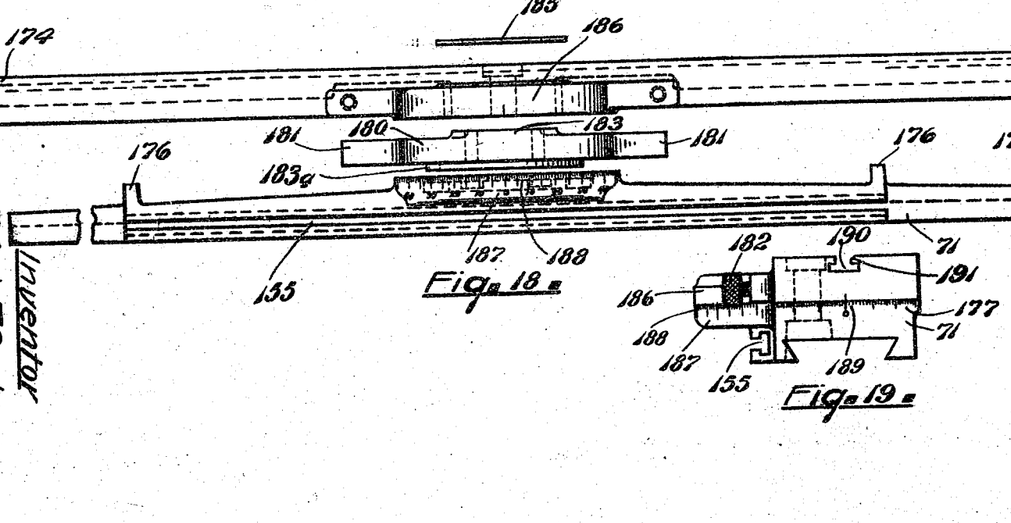
Fig. 18 is a front elevation of the sliding and work tables and the various parts of the adjusting device interposed between them.
Fig. 19 is an end elevation of said sliding and work tables.
Figures 20, 21:
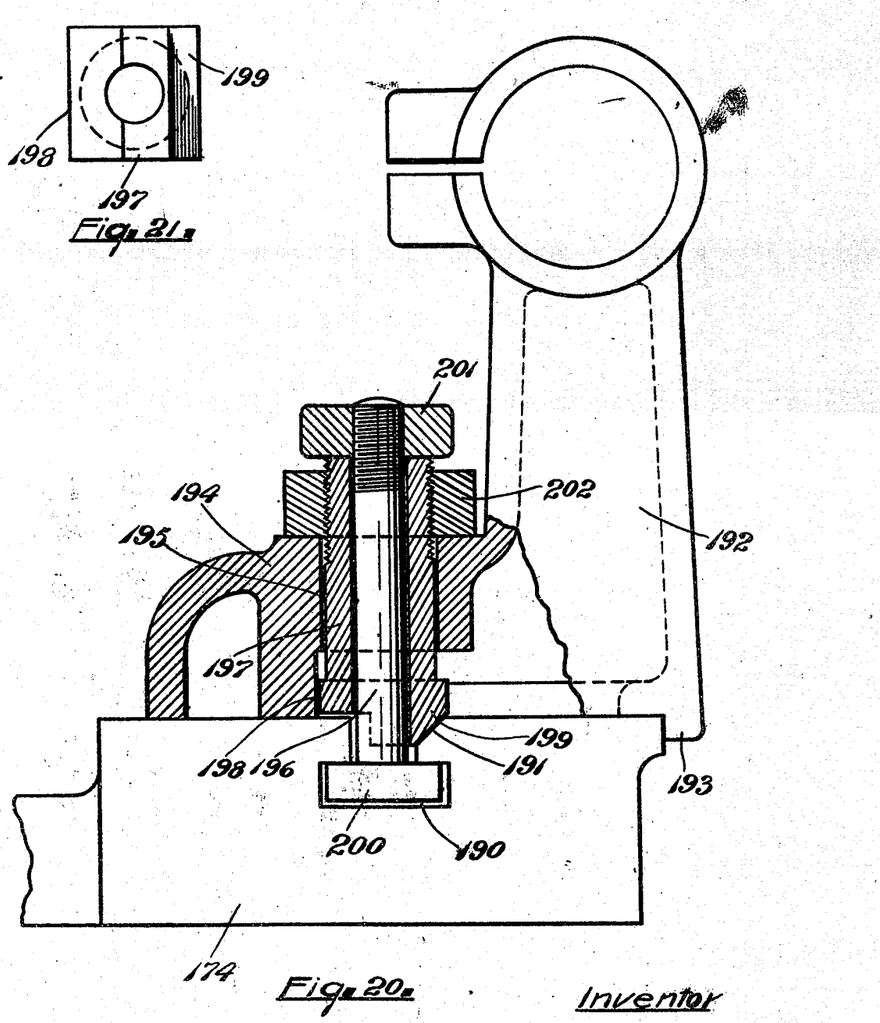
Fig. 20 is a partial sectional and end view of the work table and the bracket for carrying the head or tail stock, showing the method of connecting said brackets to the table.
Fig. 21 is an under plan view of a detail of structure used in connecting said brackets to the work table.

An elongated cylindrical sleeve 25 passes over and around the cylindrical post or standard 3 and, at its upper and lower ends, has large bearing contacts therewith as shown in Fig. 3. On the rear side of the sleeve a rib 26 of rectangular cross section is secured by set screws or other suitable connecting devices. A knee including a cylindrical section 27 passes over the sleeve 25 and has a guide 28 formed at its rear side in which the rib 26 is slidably received. Clamping members 29 and 30 of cylindrical form are passed through the knee in front of the sleeve 25, as shown in Fig. 12, and at their adjacent ends are concaved and formed with the same curvature as the outer surface of sleeve 25. A rod 31 passes through member 30 and threads into the end of the member 29 being enlarged at its outer end as shown at 32 and provided with a handle 33 for operating the same whereby said clamping members may be forced toward each other and firmly against the sleeve holding the knee in fixed relation to the sleeve. To stop the knee from too far a movement vertically a stop screw such as shown at 28ª in Fig. 3 may be used to engage the head of the upper screw in guide 28. The same form of clamping means is used to engage against the lower enlarged end 34 of the post 3 in clamping the sleeve 25 thereto, it being operated through a handle member 35. This clamping mechanism is very effective in actual practice and serves to hold the parts securely when the clamps are once set, yet is readily operable at any time to free the sleeve 25 for turning about the post 3 or the section 27 on the knee for vertical movements with respect to the sleeve. It will be noted that the plate 2 heretofore described has a series of indicating characters thereon as shown at 36 in Fig. 1, whereby the angular position of the sleeve 25 with respect to its stationary supporting post 3 may, at any time, be observed and changed as desired.

In addition to the section 27 around the sleeve 25, the knee includes integral spaced apart forwardly extending sides 37 connected at their front edges by a plate 38. A cross bar 39 is interposed between the sides 37 a short distance in front of the cylindrical section 27 and has a central vertical opening in which an interiorly threaded sleeve 40 is positioned, it receiving a screw 41 the lower end of which is fixed to a lug 42 projecting from and cast integral with the lower end of the sleeve 25. A beveled gear 43 lies directly above the bar 39 and is pinned or otherwise suitably secured to the sleeve 40 which, at its upper end, is threaded to receive a nut 44 and at its lower end has an enlarged head 45 between which and the lower side of the bar 39 a ball bearing, such as indicated at 46, is located. Meshing with the gear 43 is a beveled pinion 47 secured at the inner end of a shaft 48 rotatably mounted in suitable bearings in one of the sides 37 heretofore described. A hand wheel 49 on the outer end of the shaft is used to turn the same and, through it, rotate the sleeve 40 to effect changes in vertical position of the knee with respect to the sleeve 25 on which it is slidably mounted. Wheel 49 carries a series of indicating characters 50 coöperating with which is a pointer 50ª to indicate the amount of movement of the knee as will be readily understood. The knee is completed by an upper plate 51 interposed between the upper edges of the sides 37.

A main table 52 is slidably mounted on slides 52ª above and on the knee for movement toward and away from the sleeve 25. Such movement is effected by various mechanisms. In the front upper portion of the knee an interiorly threaded boss 53 is cast integral therewith into which, at opposite ends, nuts 54 and 55 are inserted in alinement with each other and interiorly threaded to receive the threaded end of a shaft 56 which at its forward end passes through a depending side 52ᵇ of the main table and is provided with an operating crank or handle 57. The nuts 54 and 55 are of utility to take up any wear which may occur with respect to the threaded shaft 56. It will be apparent that by turning the handle 57 the main table may be readily adjusted toward and from the central support of the machine.

Figures 4, 5, 6:
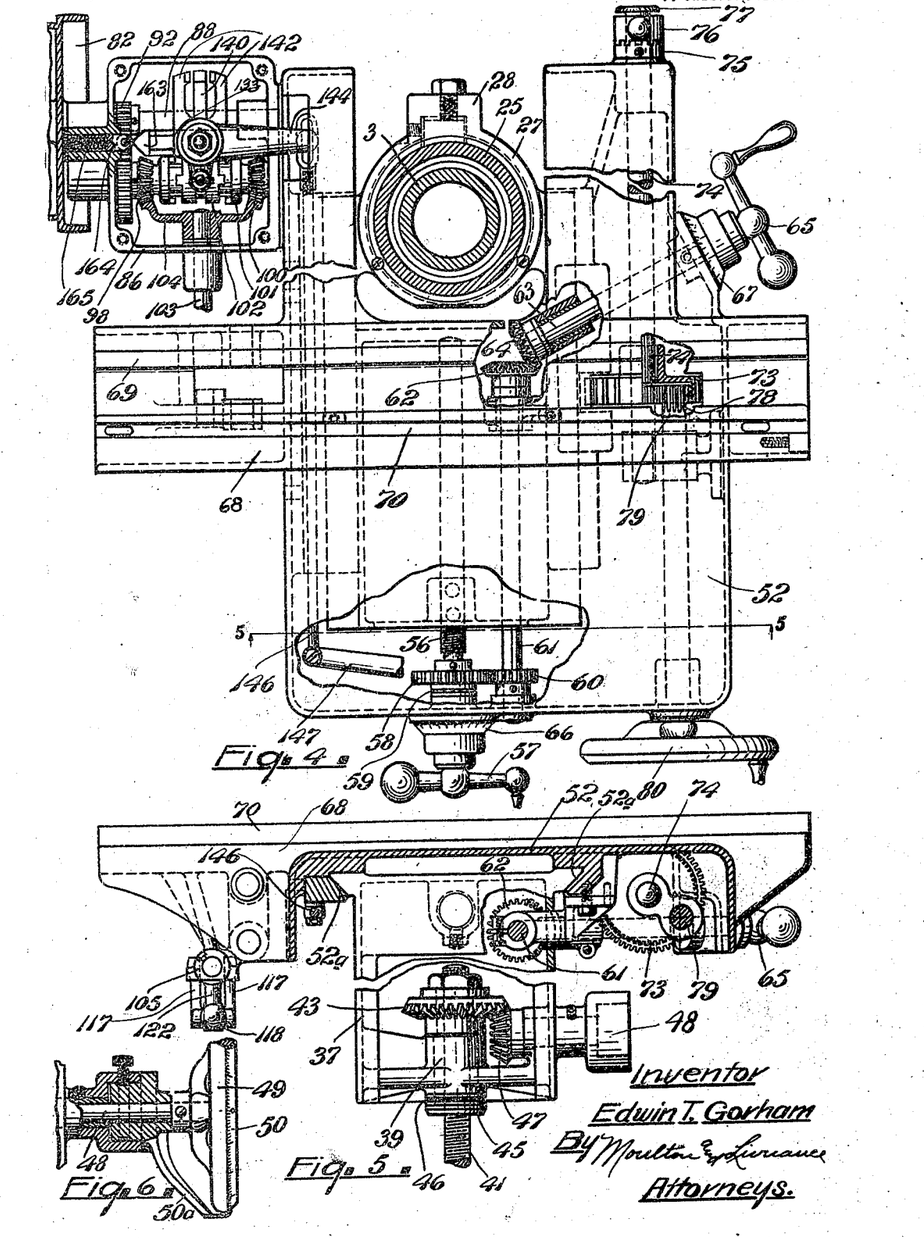
Fig. 4 is a partial sectional and plan view with parts broken away to disclose operative features of the mechanism.
Fig. 5 is a vertical section substantially on the line 5—5 of Fig. 4.
Fig. 6 is a partial sectional and side elevation of the operating wheel for raising and lowering the grinder knee with respect to its support.
Figure 7:
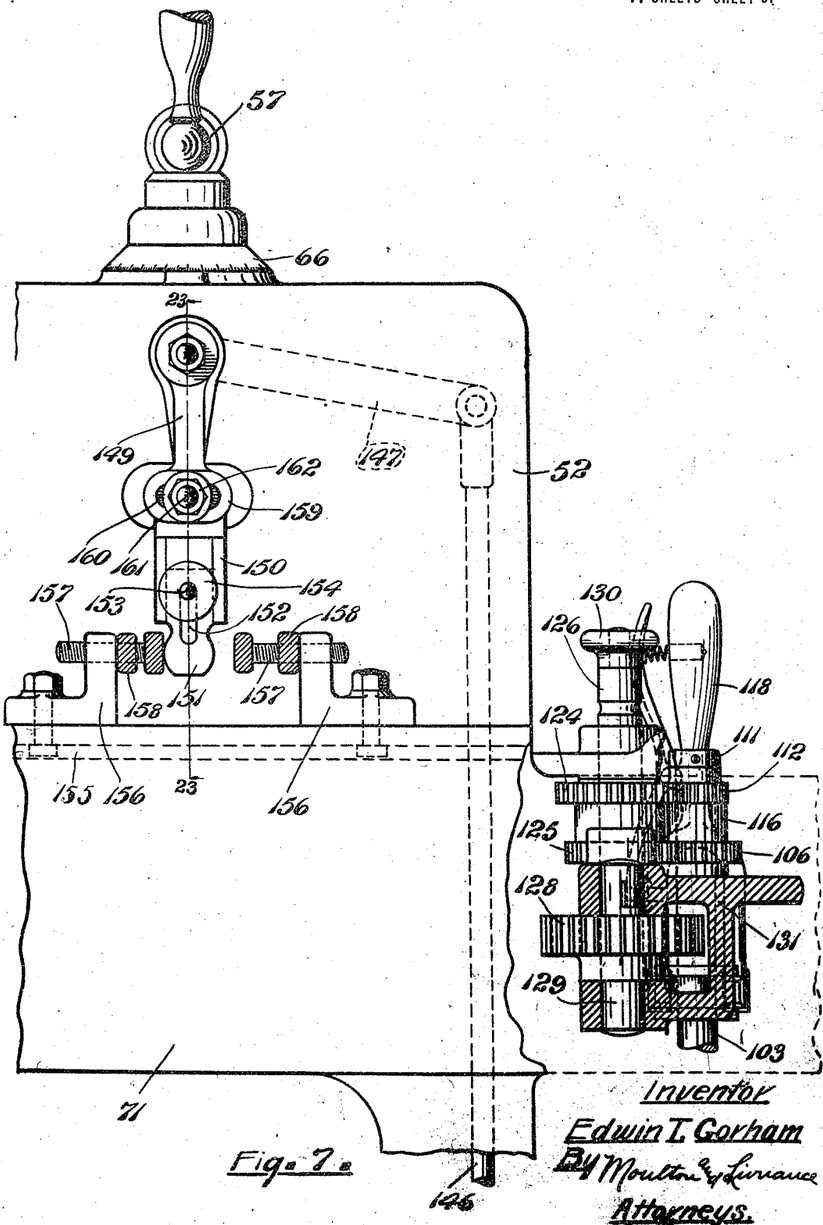
Fig. 7 is a fragmentary plan view enlarged, with parts broken away and shown in section, of a part of the machine in front of the support.
Figure 8:
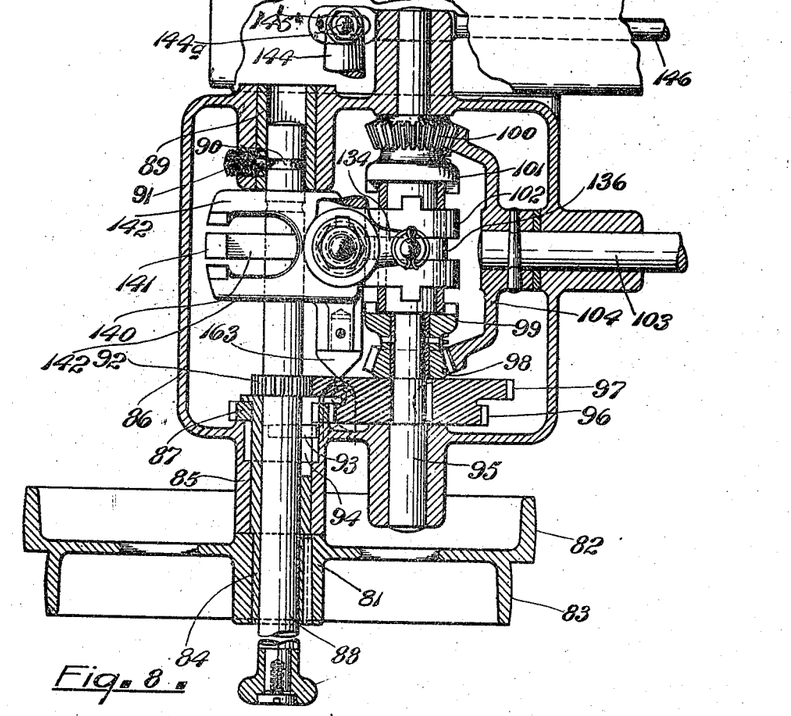
Fig. 8 is a horizontal sectional view illustrating the gearing mechanism used in automatically reversing the travel of the work table.
Figure 9:
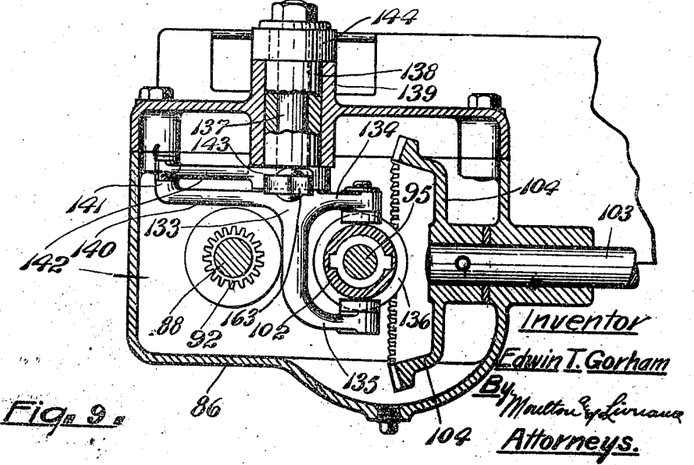
Fig. 9 is a vertical section through said mechanism.
Figure 10:
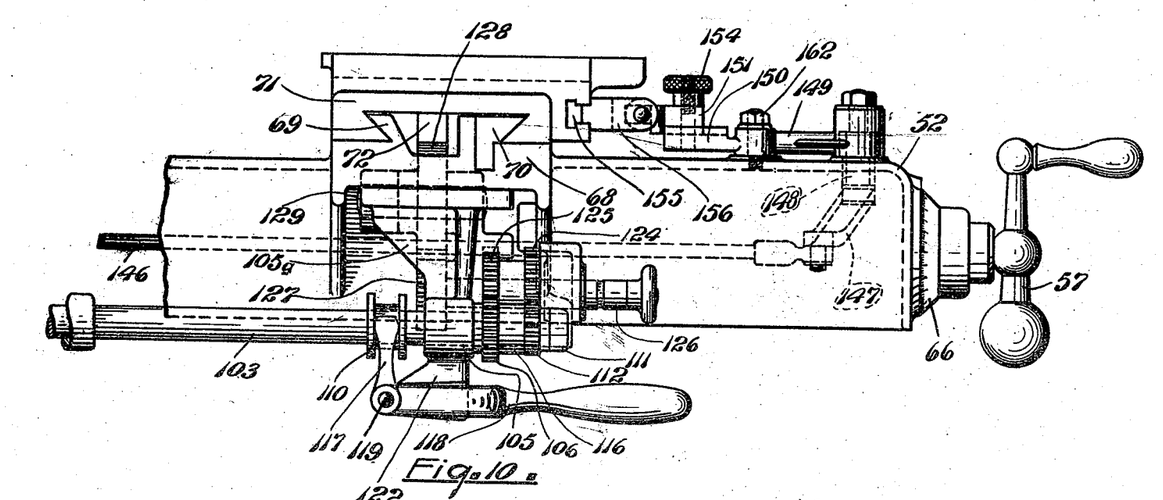
Fig. 10 is a fragmentary side elevation of that part of the machine shown in Fig. 7.

A spur gear 58 is fixed to shaft 56 a short distance back of the depending side 52$^b$ of table 52, a suitable ball bearing 59 being interposed between this gear and said side. A pinion 60 meshes with the gear and is secured at the front end of shaft 61 mounted in suitable bearings on table 52 and at its rear end having a beveled pinion 62 thereon. A shaft 63 located at an angle, as shown in Fig. 4, is mounted and carried by the table 52 at one end carrying a pinion 64 which meshes with the pinion 62, while at its opposite end a crank or handle 65 is fixed, it being clear that by operation of either the cranks 57 and 65, at their different positions with respect to the machine, the table 52 may be readily adjusted. Indicating devices 66 and 67 back of the cranks 57 and 65, respectively, serve to indicate the amount of travel imparted to the table.

A base 68 is positioned transversely of the length of the table 52 and extends at each end beyond the sides of the table. Upon this base a longitudinal guide rib 69 is formed coöperating with which is an adjustable gib 70 also extending the full length of the table. The rib and gib serve to guide and retain a sliding table 71 which is adapted in the operation of the machine to have movements back and forth over base 68.

A rack 72 is attached to the under side of the sliding table 71 with which meshes a gear 73 at the forward end of a shaft 74 mounted in suitable bearings on and carried by the main table 52. At its rear end back of the table a toothed collar 75 is pinned to the shaft and a crank 76 is loosely mounted on the shaft, it having a face toothed to connect with the collar. The end of the shaft is formed with a head 77 to stop the crank when it is moved out of engagement with the collar 75. It will be apparent that by operating the crank, table 71 may be moved manually back and forth upon the slide 68 from the rear side of the machine. In addition the gear 73 is of annular type having an interior series of teeth with which the end 78 formed with teeth as a pinion at the end of a shaft 79 meshes. Shaft 79 is carried by the table 52 and extends to the front thereof, its front end being provided with an operating wheel 80 so that the manual operation of the sliding table may be effected from either in front or back of the machine. Crank 76 is ordinarily disengaged from collar 75 when wheel 80 is operated.

In the actual operation of the machine, however, the sliding table 71 is adapted to be driven by power. A pulley 81 of compound type having two driving cones 82 and 83 of different diameters is keyed to a sleeve 84 rotatably mounted in a bearing 85 in a side of a casing or housing 86 which is located at the rear and to one side the movable table 52 being connected to move therewith. Gear 87 is loosely mounted and held upon the inner end of sleeve 84. Passing through the sleeve 84 is a short shaft 88 which extends through the casing 86 into a bushing 89 suitably journaled in the opposite side of said casing. Spaced apart grooves 90 are cut in shaft 88 adjacent its inner end for the reception of a spring actuated pin 91 which serves to retain the shaft in either of the two positions to which it may be adjusted, it being apparent that shaft 88 may be moved in the direction of its length through the sleeve 84 and the casing 86. A pinion 92 is fixed on shaft 88. A key 93 projects from one side of the shaft passing through a slot 94 in the bushing, and in one position connects the gear 87 with the shaft. It also serves to cause the shaft to rotate with sleeve 84. In another position the key is disengaged from the gear 87 allowing it to run loosely upon the sleeve 84.

Paralleling shaft 88 but a short distance in front thereof is a second shaft 95 at its ends having suitable bearings in the opposite sides of the casing 86. Two gears 96 and 97 cast integral are keyed to the shaft the former of which meshes with the gear 87 while the latter is adapted to mesh with the gear 92 when said last mentioned gear is brought into proper position. A combined beveled gear 98 and clutch member 99 are loosely mounted upon shaft 95 adjacent the gear 97. At the opposite side of the casing 86 a combined gear 100 and clutch member 101 are similarly loosely mounted upon the shaft. Between clutch members 99 and 101 a two faced coacting clutch member 102 is splined on the shaft 95. Both gears 98 and 100 are at all times in mesh with a relatively large beveled gear 104 pinned to the rear end of a shaft 103 which extends forward to a point below the sliding table 71 having support for its front end in a bearing 105 formed on a bracket 105$^a$ which depends from the end of the base 68.

Figure 11:
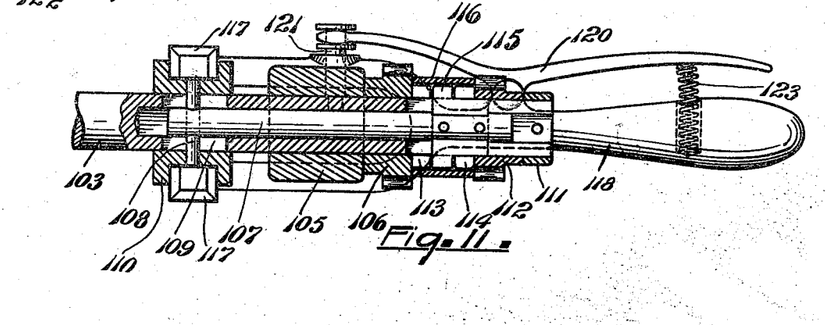
Fig. 11 is an enlarged plan and sectional view of the gear changing mechanism.

A gear 106 is loosely mounted upon the shaft 103 just beyond the bearing 105. A rod 107 extends into the end of the shaft 103 for a distance at its front end and carries a pin 108 which passes through a slot 109 in the shaft, the ends of the pin having connection with a collar 110 placed around the shaft. At the extreme forward end of shaft 103 a collar 111 is fixed abutting against which is a second gear 112 loosely mounted upon the shaft. The adjacent faces of gears 106 and 112 are provided with clutch elements 113 and 114, respectively, spaced a distance apart and between which a clutch member 115 secured to the rod 107 is located. A sleeve 116 surrounds all of the clutch elements and is interposed between gears 106 and 112 serving to properly space them. In one position of the clutch 115 as shown in Fig. 11 it is in neutral and disengaged from both the clutch elements 113 and 114 and the shaft 103 may run under such conditions without affecting either of the gears. A bell crank lever provided with upwardly extending arms 117 and a handle 118, is pivotally mounted at 119 the arms at their upper ends connecting with collar 110. A hand lever 120 is pivotally mounted on the handle 118 and at its rear end carries a pin 121 which is adapted to pass through one of the arms of the forked rear end of handle 118 and into an opening in the stationary extension 122 of the bracket 105ª upon which the bell crank lever is mounted. A coil spring 123 interposed between the free end of lever 120 and handle 118 serves to normally hold the pin 121 in place. By disengaging said pin and elevating or depressing the handle 118, rod 107 may be moved in the direction of its length so as to engage the clutch 115 carried thereby with either clutch member 113 or 114 to thereby drive either gear 106 or 112 by shaft 103.

Figure 2:
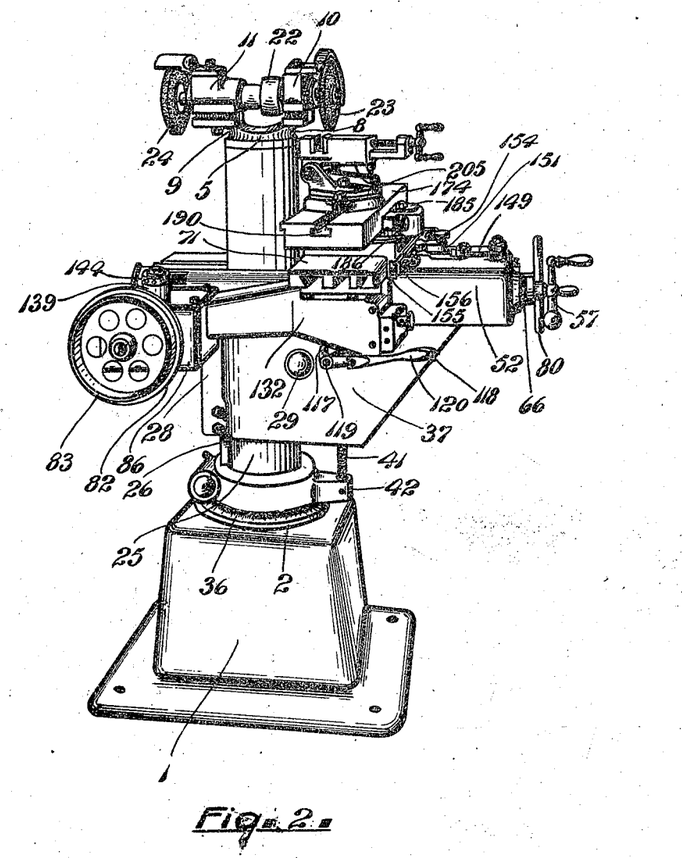
Fig. 2 is a perspective view taken from a side of the machine, certain attachments for use with the machine shown in Fig. 1 being replaced by others in this figure.

Gears 112 and 106 are in mesh with gears 124 and 125, respectively, splined upon a shaft 126 which is located upon and to one side of the shaft 103. This shaft is mounted in suitable bearings for lengthwise movement and at its rear end carries a gear 127 which is adapted to engage with a gear 128 mounted on a short shaft 129. Gear 128 engages with the rack 72 heretofore described. The forward end of shaft 126 is provided with a knob 130 for engagement by the hand whereby the gear 127 may be moved in or out of mesh with the gear 128 whereby if desired the movement of the sliding table may be stopped while the entire driving mechanism including the reverse and the change speed gearings is in motion. It of course is understood that gears 106 and 112 are of different sizes as are also gears 124 and 125 meshing therewith so that a change in the speed of the travel of the sliding table may be effected by operation of the bell crank lever one part of which is a handle 118. It will be noted in this connection that the shaft 88 may be driven at two different speeds depending upon which cone of the pulley 81 receives the belt drive. Also that the shaft 103 may be driven at two different speeds from the shaft 88 through the gearing connections 87 and 92, 96 and 97; and finally, that the gear 128 may be driven at two different speeds from the shaft 103 through the gearing connections just described there being possible altogether a driving of the table at eight different speeds from the shaft or motor which drives the machine. The shaft 103 and the gearing mechanism at its forward end is carried and housed within a casing 132 as shown in Fig. 2.

An irregularly shaped member 133 is associated with the movable clutch member 102 heretofore described it having upper and lower arms 134 and 135 carrying rollers which extend into an annular groove 136 cut midway between the ends of said member. A cylindrical post 137 extends upwardly from the member 133 through a sleeve 138 which is rotatably mounted in a suitable bearing 139 in the upper side or cover to the casing 86. An arm 140 cast integral with member 133 extends to the rear and is fashioned with an upturned end 141 which comes between the spaced apart ends of two arms 142 which at their forward ends are integral with a collar 143 connected to the lower end of sleeve 138. To the upper end of said sleeve above the bearing 139 an arm 144 is secured which at its other end has a pin 144ª passing loosely through a slot 145 in the enlarged rear end of a rod 146 extending forward under the table 52 and at its front end pivotally connected to the end of a lever 147 secured to the lower end of a post 148 which projects upwardly through the table 52 and which is rotatably mounted in a bearing therein. Arm 149 is fixed to the upper end of the post and extends to the rear, its end being fashioned with guides 150 between which a head 151 is slidably mounted. A slot 152 is made in the head through which a screw 153 carried by the member 149 projects receiving a nut 154 at its upper end by means of which head 151 may be fixed in position with respect to the arm. A T-slot 155 is cut lengthwise on the front face of the sliding table 71 in which brackets 156 are adjustably secured, each carrying an adjusting screw 157 and locking nuts 158 for firmly locking said screws against movement with respect to the brackets. It is apparent that the brackets may be moved any desired distances apart and fixed in place so as to roughly approximate any desired distance and that the finer adjustment may be accomplished by the screws 157. The arm 149 between its ends has an enlarged section 159 in which a transverse slot 160 is cut through which a stationary screw 161 carried on the table 52 extends receiving a nut 162 by means of which the arm 149 may at times be clamped to the table 52.

In operation the sliding table 71 is moved in the direction of its length through the gear 128 meshing with rack 72. The nut 162 is loose, ordinarily, and as the table 71 moves it brings the head of one of the screws 157 into engagement with the head 151 thereby turning arm 149, sleeve 148 and arm 147 to move the rod 146 in the direction of its length which, after movement for a short distance whereby the pin 144ᵃ traverses slot 145 begins to actuate the arm 144 and attached parts. The effect of this is to bring one of the members 142 into engagement with the end of arm 140 thereby turning the member 133 about its vertical axis to throw the clutch member 102 from one side to the other, disengaging it from either of the clutches 99 or 101 with which it has been engaged and engaging it with the other. It will be noted (referring to Fig. 4) that the member 133 is further provided with a projection which stands substantially opposite to the arm 144 and carries a head 163 having angular sides coming to a point. The head has contact engagement with a roller mounted at the end of a member 164 which is spring pressed toward the head 163 by a coil spring 165. When the central clutch member 102 is engaged with either of the clutch members 99 or 101 the roller bears against one of the sides of the head 163 and resists the change until it is passed from one side to the other after which it has a tendency to throw the clutch 102 over into engagement with the new clutch member. When this occurs the pin 144ᵃ is moved along the slot at 145 for a distance. This construction is desirable and, in fact, is necessary, it precluding the possibility of the clutch becoming central and insuring against the possibility of breakage of parts due to a too rigid connection of this clutch reversing mechanism with the actuating rod 146.

The clamping of the arm 149 to the table 52 is made use of only when the sliding table is operated manually by crank 76 or hand wheel 80. When thus clamped to the table it serves to stop the movement of the sliding table 71 in either direction as the head 151 strikes against the head of either screw 157 whereupon reversal of the movement of the table may be made manually.

Provision is made for wear of the sliding table upon the guides 69 and 70 which may be taken up and negatived through the following construction. The gib 70 is wider at one end than the other and at its under side has an integral projecting rib 166 of uniform thickness which is received in a slot in front of an upwardly projecting rib 167 upon the base 68. The front face of rib 167 and the slot in front thereof are positioned at an angle to the length of the slide 68 whereby the beveled edge of the gib at all times is parallel to the rib 69. Slots 168 are provided in the member 68 at its ends directly below the longitudinal slot in said member and set screws 169 pass therethrough into the rib 166. This rib adjacent one end has a slot 170 cut therein adapting it to receive the head of a screw 171 which is threaded into the relatively stationary base 68. By loosening said screws 169 and turning screw 171, the gib may be moved within limits in the direction of its length and in this manner increase or decrease the distance slightly between the beveled sides of the rib 69 and the gib 70 to compensate for wear thereon. For holding the middle portion of the gib headed screws 172 are threaded into the rib 167 a portion of the head of each screw projecting over the gib and being received in recesses 173 cut in one side thereof.

The work table 174 is mounted directly above the sliding table 71 and is pivotally connected thereto at a point substantially midway between its ends by a bolt 175. Upwardly projecting ribs 176 on the sliding table serve as bearing supports for the ends of the work table and in addition a similar rib 177 is made at one end of the sliding table. The connection of the work table to the sliding table by the bolt 175 is tight enough so that if no other means were used to hold the work table in place, it could be moved about its pivot by a relatively small amount of force such as one man could easily exert. In the upper side of the sliding table 71, however, an inverted circular T-slot 178 is cut. A recess 179 is made in the work table near its middle of a shape that it may receive an irregularly shaped member 180 having a semi-circular middle section with oppositely extending arms 181. The recess is large enough to permit a limited movement of this member in the recess. Adjusting screws 182 thread through the front face of the work table and bear against the ends of arms 181. The centrally curved portion of said irregularly shaped member is formed with a raised section 183 through which bolts 184 pass the heads of which are received in the wider portion of the T-slot 178. Directly above section 183 is a plate 185 through which the bolts pass and this plate bears against the upper surface of the part 183 and is free to move with respect to the work table when the nuts on the ends of the bolts 184 are tightened. For the angular adjustment of the work table with respect to the sliding table the nuts on the ends of bolts 184 are loosened and the work table with member 180 may be turned to any desired position by hand. This adjustment, necessarily, cannot be very accurate and, for fine and accurate adjustments, the nuts on bolt 94 are tightened thereby clamping the member 180 to the sliding table after which the fine adjustments may be completed by operation of the screws 182. Both the work table and sliding table at their middles and on their front sides are formed with circular enlargements 186 and 187 the latter of which carries a series of figures and spaces to indicate the degree of adjustment made. In addition the rib 177 at the end of the work table is provided with indicating characters and spaces 189 for use in determining very fine angular adjustments.

A T-slot 190 is cut lengthwise of the table and at its rear edge is provided with beveled portion 191 extending the full length of the slot. The head and tail stocks brackets 192 have each a downwardly projecting boss or lug 193 at its rear side adapted to fit against the rear upper edge of the work table. Said bracket is also provided with a base 194 extending over the table through which a large cylindrical vertical opening 195 is bored for the passage of a clamping bolt 196 and a surrounding sleeve 197. At its lower end the sleeve is of rectangular form with a forward face 198 adapted to bear against the rear face of a recess made in the base 194 and the rear portion of this rectangular head, indicated at 199, is cut at an angle to fit the bevel in the slot at 191. The bolt at its upper end receives a nut 201 which bears against the upper end of sleeve 197 which also extends above the base of the bracket and is threaded to receive a nut 202 as shown. In attaching the bracket 192 to the work table nut 201 is tightly forced against the end of the sleeve so that its inclined side at its lower end is forced against the beveled edge 191 of the slot 190 causing the forward face 198 to bear against the bracket and bring the lug 193 tightly against the rear edge of the work table thereby perfectly alining the bracket with respect to the table. The nut 202 is then tightened locking the parts firmly in place. These brackets 192 are adapted to carry a tail stock center as indicated at 203, or a head stock as indicated at 204. Various other attachments one of which is indicated at 205 in Fig. 2 may be applied to the work table if desired.

A grinding machine of the character described is especially free from vibration due to the very large bearing surface provided between cylindrical supporting post 3 and the elongated sleeve 25 mounted thereover. The knee on which substantially the entire mechanism is mounted is carried by said sleeve and may be turned to any desired position about the post. The knee carries the entire controlling mechanism of the machine, and the method of clamping it to sleeve 25 is especially advantageous. No injury to the sleeve can occur and no movement of the knee with respect to the sleeve can take place. The same clamp used in holding the sleeve rigidly with respect to the supporting post adds to its practical value. Further the machine is capable of control in many respects from different sides thereof. A great number of speeds is possible and a change of speed may be effected from different sides of the machine. By reason of these functions flowing from the construction of the machine the grinder is adapted for a great variety of work. A true cylinder may be ground to a minimum degree of accuracy. Taper work is also quite as effectively done; and a great deal of other kinds of grinding may be done through the use of various attachments on the work table one of which is shown in Fig. 2. The grinder may be utilized for grinding the various tools such as are used in machine shops. In fact the machine may be rightly termed a universal grinder capable of grinding practically all types of work which heretofore have required separate and distinct machines therefor.

I claim:—

1. In a grinding machine, a cylindrical stationary post, an elongated cylindrical sleeve extending the full length of the post and covering the same and having relatively large bearing contact with the post at both its upper and lower ends, whereby said sleeve is adapted to be turned relative to the post, means to clamp the sleeve to the post, a knee adjustably mounted on the sleeve, means to clamp the knee to said sleeve, a grinding wheel carried by the post, and work holding devices carried by the knee, substantially as described.

2. In a grinding machine, a cylindrical stationary post, an elongated cylindrical sleeve around and bearing upon the post, two clamping members positioned in alinement mounted on the sleeve having adjacent ends formed to fit the outer surface of the post, means to draw the clamping members toward each other against the post, a knee mounted in the sleeve, a grinder carried by the post, and work holding devices mounted on the knee, substantially as described.

3. In a grinding machine, a cylindrical upright post, having an enlarged cylindrical lower end, an elongated sleeve covering the post and bearing thereagainst, said sleeve at its lower end having an enlargement to cover the lower end of the post, two clamping members in alinement with each other mounted in the enlarged lower end of the sleeve, said members having adjacent ends at one side formed to fit the enlarged lower end of the post, means to operate the clamping members toward or away from each other, a knee mounted on the sleeve, a grinder carried by the post, and work holding means carried by the knee.

4. In a grinding machine, a cylindrical upright post, an elongated sleeve rotatably mounted on the post, a bar positioned vertically and connected to a side of the sleeve, a knee including a cylindrical section positioned around and adjustably mounted on the sleeve, said section of the knee having a guide for slidably receiving said bar, means to clamp the sleeve to the post, and means to clamp the knee to the sleeve.

5. In a grinding machine, a cylindrical upright post, an elongated sleeve rotatably mounted on the post, a bar positioned vertically and secured to a side of the sleeve, a knee including a cylindrical section positioned around and mounted for vertical adjustment on the sleeve, said section of the knee having a guide slidably receiving the bar, a pair of clamping members positioned in alinement with each other mounted on the knee, and having their adjacent ends cut to conform to the outside surface of the sleeve, similar clamping members on the sleeve having adjacent ends cut to conform to the outer adjacent surface of the post, and means to operate each of said pairs of clamping members toward or away from each other.

6. In a grinding machine, a cylindrical upright post, an elongated cylindrical sleeve around, entirely covering and having large bearing contact with the post at both its upper and lower ends, means to clamp the sleeve to the post, a knee vertically adjustable on the sleeve, and means to clamp the knee to the sleeve.

7. In a grinding machine, an upright supporting post having relatively long cylindrical bearing surfaces at its upper and lower end, an elongated sleeve rotatably mounted on and covering the post, said sleeve on its inner sides and at its upper and lower ends having bearing surfaces in engagement with the bearing surfaces on the post, means to clamp the sleeve to the post, a knee loosely mounted on the sleeve, manually operable means for raising and lowering the knee on the post, and means to clamp the knee in any position to which it may be adjusted on the sleeve.

8. In a grinding machine, a cylindrical upright supporting post, an elongated sleeve rotatably mounted on and covering the post, means to clamp the sleeve to the post, a knee including a cylindrical section through which the sleeve loosely passes, and spaced sides projecting from said cylindrical section, a bar connecting the sides, an interiorly threaded sleeve loosely mounted on the bar, a screw secured to the lower end of the first mentioned sleeve and threading into the second sleeve, means to clamp the knee to said first sleeve, and means to operate the second sleeve to move the knee relative to the first sleeve.

9. In a grinding machine, a cylindrical upright supporting post, an elongated sleeve rotatably mounted on and covering the post, means to clamp the sleeve to the post, a knee including a cylindrical section through which said sleeve loosely passes and spaced sides projecting from the cylindrical section, means to clamp the knee to the sleeve, a bar connecting said sides of the knee, an interiorly threaded sleeve rotatably mounted on the bar, a gear secured to said threaded sleeve, a screw fixed to the first sleeve extended upwardly into the threaded sleeve, a shaft rotatably mounted on one of said sides of the knee, a gear on its inner end meshing with the first gear, and an operating member for manual operation of the shaft secured to its outer end.

10. In a grinding machine, an upright supporting post provided at its lower end with an enlarged cylindrical section, and having a bearing surface at its lower end around and on the upper side of said enlarged section and with a cylindrical bearing surface for a distance on the post above said section, said post being also formed with a cylindrical bearing surface at the upper end thereof, a sleeve around the post and said enlarged section thereof also having coöperating bearing surfaces contacting with the bearing surfaces on said post and lower enlargement thereof, means to clamp the sleeve to the post, a knee adjustably mounted on the sleeve, and, a grinding wheel carried by the post and work holding devices carried by the knee, substantially as described.

11. In a grinding machine, an upright supporting post, a head secured at the upper end of the post, a grinding wheel rotatively mounted on the head, a sleeve covering and rotatably mounted on the post, means to clamp the sleeve to the post, a knee provided with a laterally projecting supporting section mounted for vertical adjustment on the sleeve, a screw fixed to and carried by the sleeve, an interiorly threaded sleeve mounted for rotation on the knee into which the screw threads, means to manually turn said threaded sleeve to effect vertical adjustment of the knee, means to clamp the knee to the sleeve, a main table slidably mounted on the knee, a table slidably mounted on the main table, to move transversely thereof, means to manually adjust the main table toward or away from the sleeve, and mechanism carried on and movable with the main table for driving the sliding table, substantially as described.

12. In a grinding machine, an upright support, a knee mounted for vertical adjustment thereon, a main table slidably mounted on the knee to move toward or away from the support, a head carried at the upper end of the support, a grinding wheel rotatably mounted on the head, work holding mechanism on the main table, a horizontal threaded shaft carried by said table extending from the front side thereof toward the support and threading into the knee, and an operating member on the end of the shaft in front of the table, whereby said table, threaded shaft and operating member may be moved together toward or away from the support.

13. In a grinding machine, an upright support, a knee, means for mounting the knee on the support for vertical and rotary adjustments thereon, means to clamp the knee in fixed relation to said support, a head secured at the upper end of the support, a grinding wheel rotatably mounted thereon, a main table slidably mounted on the knee, work holding mechanism on the main table, means operable from in front of the table for moving the table toward or away from said support, and separate operating means operable at another side of the table for moving it toward or away from said support, both of said operating means being carried by and movable with the table.

14. In a grinding machine, a vertical support, a knee mounted thereon for vertical and rotary adjustment with respect thereto, a main table slidably mounted on the knee, a screw threaded shaft carried by the table and extending rearwardly into the knee, interiorly threaded devices on the knee through which said shaft passes, a gear on the shaft in front of the knee, a second shaft rotatably mounted on the table, a pinion thereon meshing with the gear, an operating member on the first shaft in front of the table, means to operate the second shaft from another side of the table, a grinding wheel rotatably mounted above the support, and work holding mechanism carried by the main table.

15. In a grinding machine, a vertical support, a grinding wheel rotatably mounted at the upper end of the support, a knee mounted on the support for vertical and rotary adjustment with respect thereto, a main table slidably mounted on and above the knee, a screw threaded shaft carried by the table extending rearwardly into the knee, an interiorly threaded device on the knee through which the shaft passes, a gear on the shaft in front of the knee, a second shaft carried by the table, a pinion thereon at its front end meshing with the gear, a beveled pinion secured at its rear end, a third shaft on the table located at an angle to said second shaft, a beveled pinion on its front and meshing with the beveled pinion on the second shaft, and manually operable members on the forward end of the first shaft and rear end of the third shaft, respectively, substantially as described.

16. In a grinding machine, a main table, a sliding table slidably mounted on the main table and located transversely thereof, a rack carried by and below the sliding table, a shaft carried by the main table back of the rack, a second shaft carried by the main table in front of the rack, and means to move the sliding table on rotation of either of said shafts, substantially as described.

17. In a grinding machine a main table, a sliding table slidably mounted on the main table and located transversely thereof, a shaft carried by the main table back of the sliding table, a second shaft carried by the main table in front of the sliding table, a rack secured lengthwise of the sliding table, a gear on the front end of the first shaft meshing with the rack, an annular gear cut on said gear, teeth cut in the rear end of the second shaft meshing with the annular gear, and operating members on the rear and front ends of said first and second shafts, respectively, said operating members being located back and in front of said main table.

18. In a grinding machine, a main horizontal table, a sliding table slidably mounted above and transversely of the main table, means for manually operating the sliding table back and forth over the main table from in front of the main table, and means to similarly move said sliding table from back of the main table.

19. In a grinding machine, a main horizontal table, a sliding table slidably mounted above and transversely of the main table, a rack connected to the sliding table, two shafts carried by the main table, one in front and one back of said sliding table, gearing connections between the shaft and the rack, an operating member on the front shaft in front of the main table, a collar secured to the rear shaft back of the main table, a crank slidably mounted on said rear shaft adjacent the collar, and engaging devices formed on adjacent faces of the collar and crank, substantially as described.

20. In a grinding machine, a vertical support, a sliding table having an inverted circular T-slot in its upper side between its ends, a work holding table pivotally mounted between its ends to the sliding table and having a recess cut in its under side, an irregularly shaped member including a central circular section and oppositely extending arms located in the recess, an upwardly projecting lug on the upper side of the circular section extending through the work holding table, bolts having heads located in the T-slot and passed through said member and lug, a plate above the work holding table resting in the lug through which the bolts pass, nuts threaded on to the bolts against the plate, and adjusting screws threaded through the work table and bearing against the end of each arm of said member.

21. In a grinding machine, a table provided with a circular inverted T-slot in its upper side between its ends, a work holding table pivotally mounted between its ends to the first table and provided with a recess in its under side, an irregularly shaped member including a circular section and oppositely extending arms located in the recess with the circular section directly above the T-slot, a lug on the upper side of the circular section of the member extending through the work holding table, bolts passed through the member and lug thereon, the heads of the bolts being received in the T-slot, a plate above the work holding table resting in the lug through which the bolts pass, nuts threading on to the upper ends of the bolts, and adjusting screws threaded through the front of the work holding table into the recess, one engaging against the end of each arm of said member.

22. In a grinding machine, a work holding table provided with a longitudinal inverted T-slot in the upper face thereof, said slot at its rear upper side having an inclined face, a bracket having a base bearing against the upper side of the table, a lug on the bracket directly back of and bearing against the rear edge of the table, a threaded sleeve passing loosely through the base, a head on the lower end of the sleeve provided with an inclined face at its lower rear corner to bear against the inclined side of the slot, a nut threading on to the upper end of the sleeve, a bolt passing through the sleeve, the head of the bolt being located in the wider portion of the T-slot, and a nut threading on to the bolt to bear against the upper end of the sleeve.

23. In a grinding machine, a main table, a base located transversely of the main table and extending beyond the sides thereof, a table slidably mounted on the base, a bracket depending from one end of the base, a casing secured to the main table back of the bracket, a shaft, bearings therefor in said bracket and casing, gearing connections between the shaft and the sliding table and means to drive the shaft at its rear end in opposite directions automatically operated by movements of the sliding table.

24. In a grinding machine, a horizontal main table, a base located transversely of the main table and extending beyond the sides thereof, a table slidably mounted on the base, a casing secured to the main table at one side thereof and back of said base, a shaft, bearings therefor in the casing and carried by the base, change speed gearing connections between the shaft and the sliding table for driving the table at different speeds while the shaft is running at constant speed, means to drive the shaft, and mechanism for reversing the direction of rotation of the shaft automatically operated by the sliding table.

25. In a grinding machine, a horizontal main table, rotary adjustment about the support and horizontal adjustment toward and away from the support, a table slidably mounted for movements transversely of the main table, a shaft supported alongside the main table, change speed gearing connections between the forward end of the shaft and the sliding table, a driving shaft, gearing connections between it and the rear end of the first shaft including mechanism for reversing the direction of rotation of said first shaft, and means to operate said reversing mechanism automatically controlled by the sliding table, said first shaft, driving shaft, and gearing connections at each end of the first shaft being connected to and movable with the main table.

26. In a grinding machine, a main table, a table mounted for transverse sliding movements over the main table, a shaft, a housing connected to the main table in which the shaft is located, a second shaft having a bearing at its rear end in said housing, reversing gearing between and connecting said shafts, a bearing for the forward end of said second shaft carried by the main table, gearing connections between the forward end of said shaft and the sliding table, operating mechanism for the reverse gearing carried by the main table in front of the sliding table, and a rod connecting said operating means with the reverse gearing.

27. In a grinding machine, a main table, and horizontal movements toward and away from the support, a table mounted on the main table for sliding movements transversely thereof, a casing secured at one side and at the rear of the main table, a drive shaft mounted in the casing, a second shaft therein, change speed gearing connections between the shafts located in the casing, a third shaft having its rear end extended into the casing, a bearing for the forward end of said third shaft carried by the main table under the sliding table, reverse gearing in the casing interposed between and connecting the second and third shafts, change speed gearing connections between the third shaft and the sliding table, operating mechanism for the reverse gearing carried by the main table in front of but operatively associated with the sliding table, and a rod connecting said operating mechanism with the reverse gearing.

In testimony whereof I affix my signature.

EDWIN T. GORHAM.